United States Patent
Drolia et al.

(10) Patent No.: US 11,606,602 B2
(45) Date of Patent: Mar. 14, 2023

(54) AUTOMATIC PROFILING OF VIDEO ANALYTICS APPLICATIONS

(71) Applicant: NEC Laboratories America, Inc., Princeton, NJ (US)

(72) Inventors: Utsav Drolia, Milipitas, CA (US); Min Feng, Monmouth Junction, NJ (US); Wang-pin Hsiung, Santa Clara, CA (US); Srimat Chakradhar, Manalapan, NJ (US); Oliver Po, San Jose, NJ (US); Kunal Rao, Monroe, NJ (US)

(73) Assignee: NEC Corporation

( * ) Notice: Subject to any disclaimer, the term of this patent is extended or adjusted under 35 U.S.C. 154(b) by 397 days.

(21) Appl. No.: 16/815,453

(22) Filed: Mar. 11, 2020

(65) Prior Publication Data
US 2020/0296452 A1    Sep. 17, 2020

Related U.S. Application Data

(60) Provisional application No. 62/816,463, filed on Mar. 11, 2019.

(51) Int. Cl.
| | |
|---|---|
| *H04N 21/44* | (2011.01) |
| *G06Q 10/06* | (2012.01) |
| *G06F 11/34* | (2006.01) |
| *G06F 16/901* | (2019.01) |
| *G06V 20/52* | (2022.01) |
| *G06Q 10/0639* | (2023.01) |

(52) U.S. Cl.
CPC ... *H04N 21/44008* (2013.01); *G06F 11/3447* (2013.01); *G06F 16/9024* (2019.01); *G06Q 10/0639* (2013.01); *G06V 20/52* (2022.01); *H04N 21/44012* (2013.01)

(58) Field of Classification Search
None
See application file for complete search history.

(56) References Cited

U.S. PATENT DOCUMENTS

| | | | |
|---|---|---|---|
| 9,304,835 B1* | 4/2016 | Ekanadham | G06F 16/9024 |
| 9,400,700 B2* | 7/2016 | Ekanadham | G06F 9/5044 |
| 2016/0188385 A1* | 6/2016 | Ekanadham | G06F 9/5044 719/328 |
| 2016/0219117 A1* | 7/2016 | Marlatt | H04L 41/0816 |
| 2019/0043201 A1* | 2/2019 | Strong | G06V 10/771 |

OTHER PUBLICATIONS

Zhang et al., "Live Video Analytics at Scale with Approximation and Delay-Tolerance", Princeton University, Mar. 2017.

* cited by examiner

*Primary Examiner* — Ronald Laneau
(74) *Attorney, Agent, or Firm* — Joseph Kolodka

(57) ABSTRACT

Methods and systems for deploying a video analytics system include determining one or more applications for a security system in an environment, including one or more constraints. Each functional module in a directed graph representation of one or more applications is profiled to generate one or more configurations for each functional module. The nodes of each graph representation represent functional modules of the respective application, and repeated module configurations are skipped. Resource usage for each of the one or more applications is estimated using the one or more configurations of each functional module and the one or more constraints. The one or more applications are deployed in the environment.

20 Claims, 10 Drawing Sheets

US 11,606,602 B2

AUTOMATIC PROFILING OF VIDEO ANALYTICS APPLICATIONS

RELATED APPLICATION INFORMATION

This application claims priority to U.S. Provisional Patent Application No. 62/816,463, filed on Mar. 11, 2019, incorporated herein by reference herein its entirety.

BACKGROUND

Technical Field

The present invention relates to video analytics and, more particularly, to the profiling and implementation of a video analytics system in a new environment.

Description of the Related Art

Performing video analytics across video feeds in a large facility is challenging, particularly in contexts like stadiums. In some cases, video feeds may be needed in areas where network connectivity is limited or intermittent, with a large amount of analysis being performed in real-time.

Thus, given the variability across different environments, it is difficult to predict what resources will be needed for a particular installation. As such, deployment can involve substantial labor and manual testing, or expensive over-deployment.

SUMMARY

A method for deploying a video analytics system include determining one or more applications for a security system in an environment, including one or more constraints. Each functional module in a directed graph representation of one or more applications is profiled to generate one or more configurations for each functional module. The nodes of each graph representation represent functional modules of the respective application, and repeated module configurations are skipped. Resource usage for each of the one or more applications is estimated using the one or more configurations of each functional module and the one or more constraints. The one or more applications are deployed in the environment.

A system for deploying a video analytics system includes a module profiler that uses a processor to determine one or more applications for a security system in an environment, including one or more constraints, and to profile each functional module in a directed graph representation of the one or more applications to generate one or more configurations for each functional module. The nodes of each graph representation represent functional modules of the respective application, and repeated module configurations are skipped. A resource estimator is configured to estimate resource usage for each of the one or more applications using the one or more configurations of each functional module and the one or more constraints. A system deployer is configured to deploy the one or more applications in the environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide distributed streaming video analytics, in one example for use in real-time authentication of large numbers of people. In particular, the video analytics system described herein is implemented in a number of modules. It is easier to determine a particular installation's needs on a per-module basis than as a complete system, such that the present embodiments can provide a fully provisioned video analytics system without the need for repetitious testing or over-deployment.

In contrast to profiling an environment, for example by iteratively running the system and applications under different loads, hardware, and configurations, and measuring the resource use, the present embodiments make use of a system structure that is modeled as a directed acyclic graph, with nodes representing different system modules that perform specific functions. These modules are reused across multiple different applications. Profiling can therefore be done at the module level, with the results of module profiling being reusable in all applications that the module is a part of. This simplifies the task of profiling by decreasing the complexity of the modules being modeled, and further promotes reuse once a given module has been adequately profiled.

Figure 1:
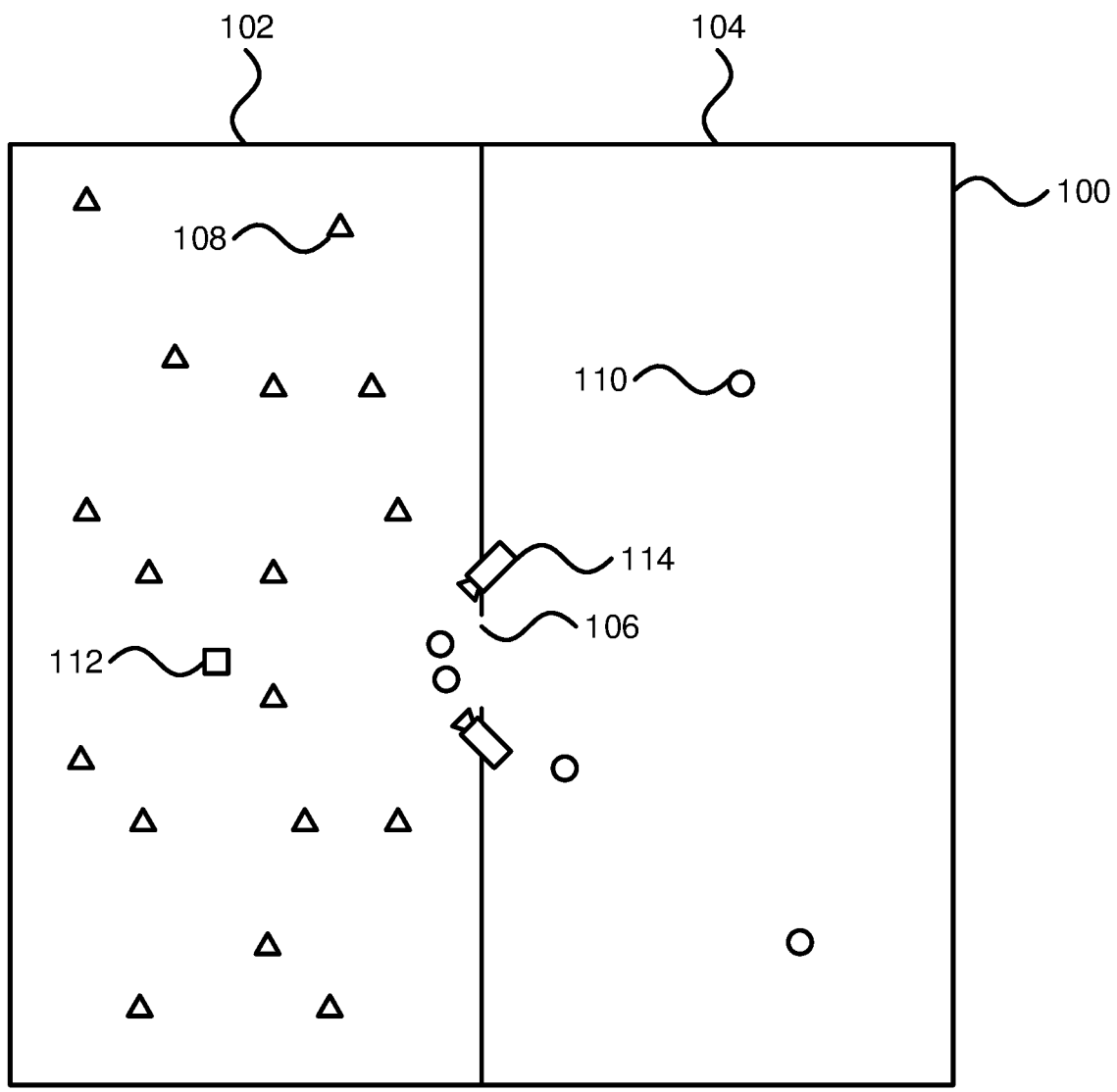
FIG. 1 is a diagram of an environment that includes a secured area and an unsecured area, with distributed multi-factor authentication being used to handle access to the secured area, in accordance with an embodiment of the present invention.

Referring now to FIG. 1, an exemplary monitored environment 100 is shown. It should be understood that the present embodiments are described in the specific context of video monitoring and authentication, but it should be understood that this application is supplied solely for the purpose of illustration, and should not be construed as being limited on the field or functionality of the present embodiments.

The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is a banned individual 112, shown as a square. The unauthorized individuals 108 are permitted access to the uncontrolled region 102, but not to the controlled region 104. The authorized individuals are permitted access to both the uncontrolled region 102 and the controlled region 104. The banned individual 112 is not permitted access to either region.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104. Additional monitoring devices (not shown) can be used as well, for example to capture radio-frequency identification (RFID) information from badges that are worn by authorized individuals 108.

When deploying a video analytics system, such as the one described above, it can be difficult to anticipate what resources will be needed. For example, in the exemplary environment 100, it may not be apparent how many video cameras 114 would be needed to fully cover the traffic through the gate 106. Other resources, such as bandwidth, storage, and processing capability can similarly be difficult to predict without complex system profiling.

Figure 2:
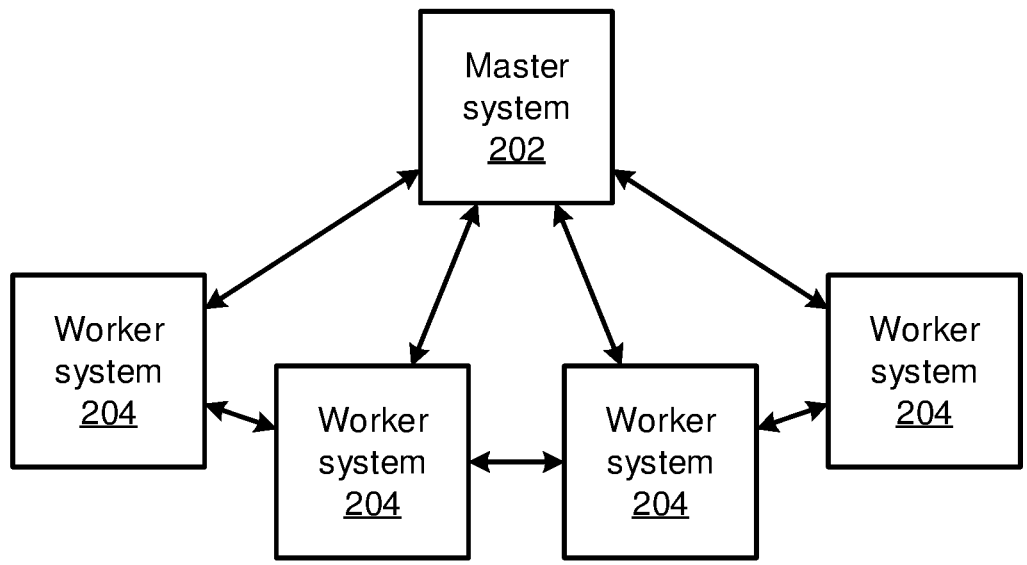
FIG. 2 is a block diagram of a distributed multi-factor authentication system that includes multiple worker systems in communication with a master system, where the communication network may be unreliable, in accordance with an embodiment of the present invention.

Referring now to FIG. 2, a diagram of a distributed authentication system is shown. A single master system 202 communicates with a number of worker systems 204. The master system 202 handles watchlist management, alert management, and can optionally also handle third-party message management. Worker systems 204 are assigned to respective regions in the environment 100, or in some cases to particular gates 106, and locally handle multi-factor authentication and watchlist checking. Depending on the computational resources of the worker systems 204, one or more video streams can be handled at each worker system 204.

In general, for applications where there need only be a single instance across a site, such functions are implemented by the master system 202. In contrast, video collection, face detection, RFID detection, and other related tasks are performed by the individual worker systems 204.

In some embodiments, the worker systems 204 can be connected to the master system 202 by any appropriate network, for example a local area network. In other embodiments, the worker systems 204 can be connected to the master system 202 and to one another via a mesh network, where each system communicates wirelessly with one or more neighboring systems to create a communication chain from each worker system 204 to the master system 202. In some cases, where communication with the master system 202 is unreliable or intermittent, the worker systems 204 can communicate with one another to obtain credential information and watchlists. In some embodiments, the worker systems 204 can communicate with one another via a distinct network as compared to their communications with the master system. For example, worker systems 204 may be connected to one another via a wired local area network, whereas the master system 202 may be available through a wireless network, such as a cell network.

Figure 3:
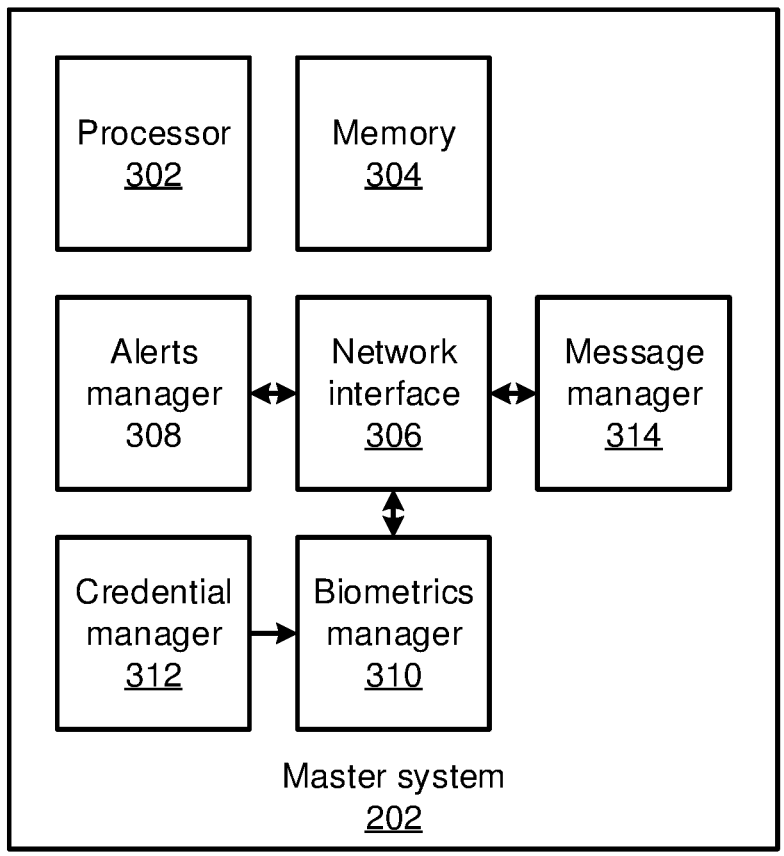
FIG. 3 is a block diagram of a master multi-factor authentication system in accordance with an embodiment of the present invention.

Referring now to FIG. 3, detail of an exemplary master system 202 is shown. The master system 202 includes a hardware processor 302 and a memory 304. A network interface 306 provides communications between the master system 202 and the worker systems 204. The network interface 306 can also provide communications with other systems, such as corporate databases that include credential information, as well as providing access to third-party information, including data streams, watchlist information, and credential information. The network interface 306 can communicate using any appropriate wired or wireless communications medium and protocol.

An alerts manager 308 can, for example, use the network interface 306 to receive communications from the worker systems 202 relating to individual authentication results. For example, when a worker system 202 determines that an unauthorized individual 106 has entered a controlled region 104, the alert manager 308 can issue an alert to a supervisor or to security personnel. The alert manager 308 can also trigger one or more actions, such as sounding an alarm or automatically locking access to sensitive locations and material. The alerts manager 308 can furthermore store alerts from the worker system 202, including information relating to any local overrides at the worker system 202.

A biometrics manager 310 can manage watchlists, including lists of authorized individuals and banned individuals, and can furthermore maintain information relating to the people in those lists. For example, biometrics manager 310 can maintain a database for each individual in each list, to store details that may include an identification number/barcode, the individual's access privileges, the individual's work schedule, etc. The biometrics manager 310 can provide an interface that allows users to add, update, and remove individuals from watchlists, to turn on and off authentication for particular watchlists, to add, remove, and update watchlists themselves, to search for individuals using their names or images, and to merge records/entries when a particular individual has multiple such records.

The biometrics manager 310 can communicate with a credential manager 312. The credential manager 312 can interface with a corporate database, for example via local storage or via the network interface 306, to retrieve credential information for individuals, such as their identification number/barcode, an image of the individual, the individual's schedule, and the individual's access privileges. The credential manager 312 can, in some embodiments, be integrated with the biometrics manager 310, or can be implemented separately. In some embodiments, the credentials can be stored in a hash table.

A message manager 314 receives third-party information through the network interface 306. This third-party information can include third-party scan messages, which can be provided to other systems. For example, message manager 314 can provide an interface to third-party applications that makes it possible to perform authentication and issue alerts based on information that is collected by a third-party barcode reader or RFID reader.

Figure 4:
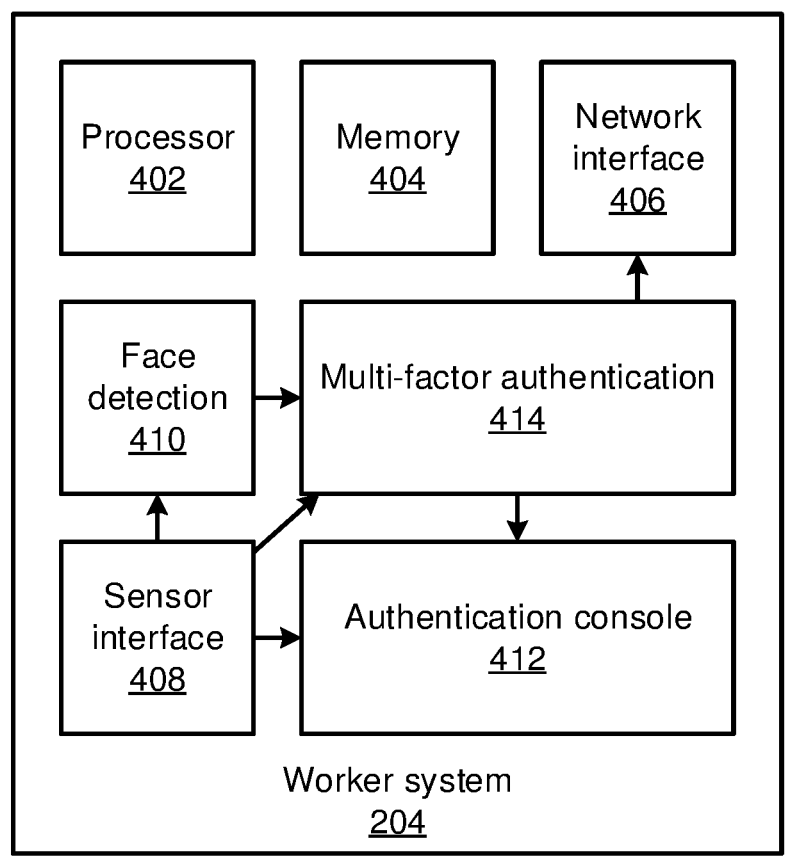
FIG. 4 is a block diagram of a worker multi-factor authentication system in accordance with an embodiment of the present invention.

Referring now to FIG. 4, detail of an exemplary worker system 204 is shown. The worker system 204 includes a hardware processor 402 and a memory 404. A network interface 406 provides communications between the worker system 204 and the master system 202. The network interface 406 can also provide communications with one or more network-enabled data-gathering devices, such as networked security cameras. The network interface 406 can communicate using any appropriate wired or wireless communications medium and protocol.

A sensor interface 408 gathers information from one or more data-gathering devices. In some embodiments, these devices can connect directly to the sensor interface 408 to provide, e.g., a video stream, RFID tag scans, or barcode scans. In other embodiments, the data-gathering devices can be network-enabled, in which case the sensor interface 408 collects the information via the network interface 406. It should be understood that the sensor interface 408 can support connections to various types, makes, and models of data-gathering devices, and may in practice represent multiple physical or logical components, each configured to interface with a particular kind of data-gathering device.

In embodiments where the sensor interface 408 receives information from one or more video cameras, the sensor interface 408 receives the camera feed(s) and outputs video frames. In embodiments where the sensor interface 408 receives information from an RFID device or a barcode scanner, the sensor interface 408 retrieves the scan message from the device, filters duplicate scans within a predetermined time interval, and outputs filtered scan messages.

Face detection 410 is performed on video frames from the sensor interface 408. Detected faces in the frames are provided to multi-factor authentication (MFA) 414. Face detection 410 can include filtering a region of interest within a received video frame, discarding unwanted portions of the frame, and generating a transformed frame that includes only the region of interest (e.g., a region with a face in it). Face detection 410 can furthermore perform face detection on the transformed frame. In some embodiments, for example when processing video frames that include multiple regions, the different regions of interest can be processed serially, or in parallel, to identify faces.

MFA 414 retrieves detected faces and stores them for a predetermined time window. In addition, MFA 414 collects information from, e.g., scan messages (including third-party scan messages), and uses multiple factors of authentication to provide an authentication result. The multiple factors can include face matching, barcode matching, and schedule matching.

In face matching, MFA 414 determines whether a detected face in a video frame matches one or more individuals stored in a database. In barcode matching, MFA 414 determines whether the scanned barcode or RFID identifier matches an individual's associated number in the database. In schedule matching, MFA 414 determines whether a person who has been identified using one of the other factors is expected to be entering a particular controlled area 104 at the time in question.

In one example, the MFA 414 may recognize the face of an authorized individual 108 approaching a gate 106. The MFA 414 may furthermore determine that the individual is carrying their badge, for example by scanning an RFID tag in the badge. However, upon checking the individual's schedule, the MFA 414 may determine that the individual is not scheduled to work on that day, and may deny access. In another example, if the MFA 414 determines that an authorized individual's badge is present, and that the individual is scheduled to work, but finds that the detected face does not match the stored image of the user, the MFA 414 may deny access. By using multiple authentication factors, MFA 414 prevents unauthorized accesses that might otherwise be overlooked.

MFA 414 can furthermore connect to the master system 202, and in particular biometrics manager 310, to obtain watchlist information, including the above-mentioned details of the individuals in the watchlists. Because the network connection between the worker systems 204 and the master system 202 can be unreliable or intermittent, MFA 414 can keep track of how recently the watchlist was updated and can provide a local alert through the authentication console 412 when the watchlist is significantly out of date. The MFA 414 can furthermore communicate to the alerts manager 308 information regarding any denial or grant of access, including the reasons therefore, to trigger an appropriate alert. This information can be stored for audit purposes. If access was granted, then the stored information can include their identity and the time of access. If access was denied, then the stored information can include their identity, the time of denial, and the reason for denial. In the event that the determination of the MFA 414 is overridden by a supervisor, then information can also be stored regarding who performed the override, what the original result and the override result were, and the time.

Face detection 410 can store detected faces in memory 404. In some embodiments, the detected faces can be removed from memory 404 after the expiration of a predetermined time window. MFA 414 can similarly keep a face matching request for a predetermined time period. If no face is matched in that time, MFA 414 can delete the face matching request.

An authentication console 412 receives information from the sensor interface 408, for example collecting video frames. The authentication console 412 provides a user interface for security personnel, making it possible for such personnel to view the camera feeds, to view authentication results from MFA 414 (along with reasons for denial), to view schedule information for recognized individuals, to view the network connection status to the master system 202, to view the database freshness (e.g., the amount of time since the database was last updated), to search for particular credentials, to view and adjust the position of particular cameras/sensors, and to override determinations made by MFA 414.

The authentication console 412 can also manage notifications. These notifications can include instructions from the master system 202 to add, update, or remove particular watchlists, instructions which the authentication console 412 can perform responsive to receipt of the notifications. The notifications can also include local notifications, for example pertaining to whether the watchlists are freshly synchronized to the watchlists on the master system 202.

Figure 5:
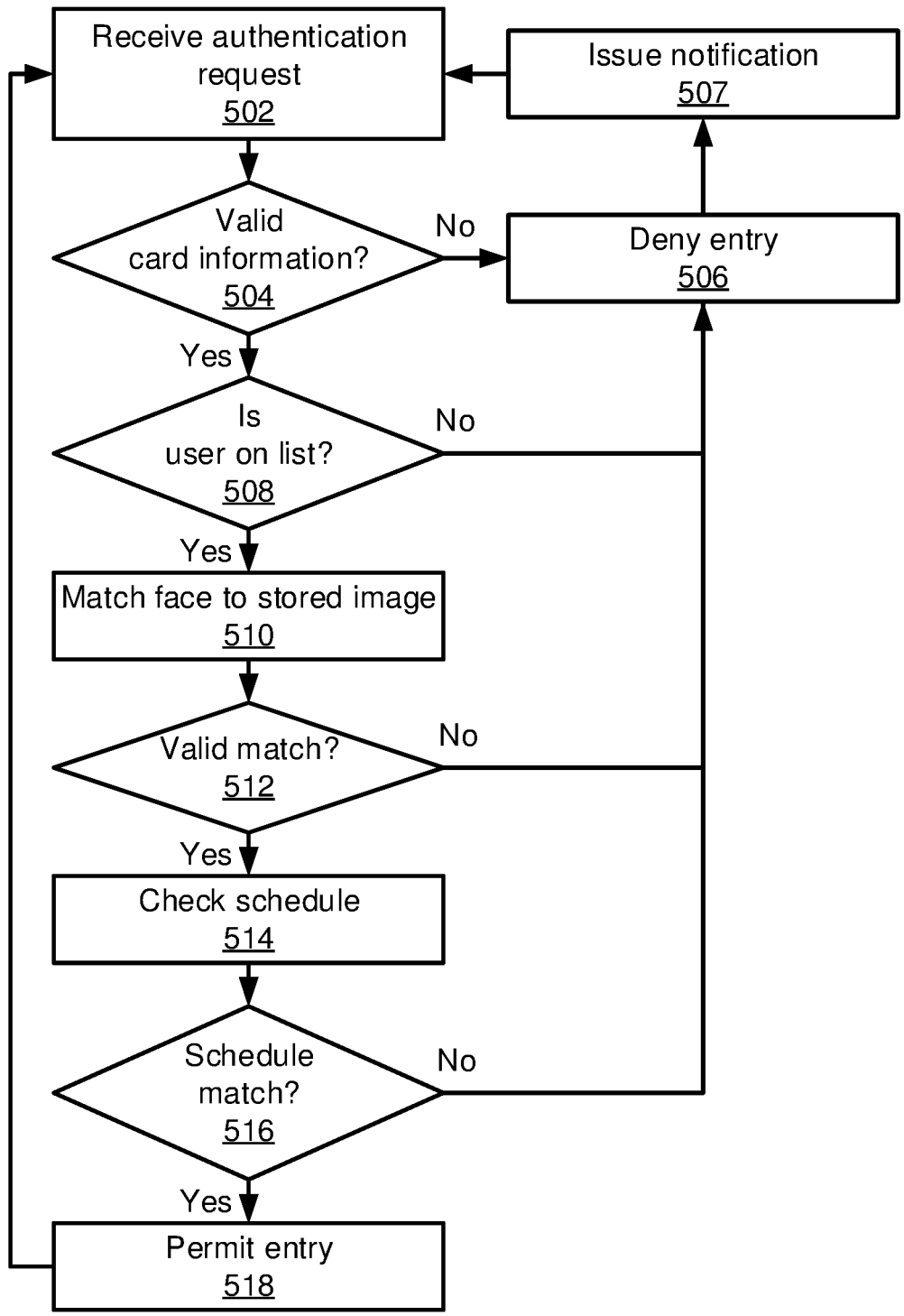
FIG. 5 is a block/flow diagram of a method for performing distributed multi-factor authentication in accordance with an embodiment of the present invention.

Referring now to FIG. 5, a method of performing MFA is shown. Block 502 receives an authentication request, for example upon receipt of a scan message from a user's barcode or RFID badge, or upon detection of an individual approaching a gate 106. Block 504 determines whether the individual's card information (e.g., an identifier stored in the barcode or RFID badge) is valid. This determination can include, for example, determining whether the individual has stored credentials at all. In some situations, the scan message may have an inaccurate or incomplete identifier. In other situations, the identifier may be from an old card, or one from a different site, such that the credentials are not stored. In any of these events, entry to the secured area 104 can be denied in block 506, and a notification can be issued in block 507 to the authentication console 412 to indicate that an unknown individual has attempted to gain access to the secured area 104.

If the individual's credentials are found, block 508 checks whether the individual is on one or more watchlist for the secured area 104. For example, the watchlist may indicate that the individual is one who is permitted access. If not, block 506 denies the individual entry. In some embodiments, block 508 can also check for membership to a list of individuals who are denied entry, in which case membership on the list will cause processing to pass from block 508 to block 506.

If the individual is on the watchlist, block 510 matches a detected face for the approaching individual, extracted from a video stream, to a stored image of the user. Block 512 then determines whether the face matches. In some events, the face may not match due to a low-quality image capture, while in other events, the two images may show different faces. In these events, block 506 denies entry, and block 507 can issue a notification to the authentication console 412 to indicate that the individual needs to pose for a better picture, or that there is a mismatch between the person who owns the card and the person who scanned the card.

Block 510 can operate within a defined time window. When an authentication request is received, all faces detected during a first time window (e.g., between 10 and 30 seconds) are matched to the stored image of the user. If a match is found, operation proceeds. If not, the authentication request can be repeated, for example every second, with the subsequently detected faces for a second time window (e.g., between 1 and 5 seconds). If no match has been found after the expiration of the second time window, the authentication request can be denied. The lengths of the time windows can vary, depending on the operational environment. In some embodiments, the denial can be delayed for a period of time to give the user an opportunity to change their pose for another attempt. In some embodiments, when a face is matched, all detected faces within the time window that match the matched face can be removed. This prevents another person from scanning the same card again, while the original user's face images are still stored for matching.

Block 514 then checks the schedule associated with the individual. The schedule can indicate, for example, whether the individual would plausibly have a need to enter the secured area 104 at the time in question. If the individual's schedule does not match the time of the scan message, then block 506 can deny entry, and block 507 can issue a notification to the authentication console 412 to indicate that the individual is not permitted access at the present time.

If all of these different checks are successful, then block 518 can permit entry. This can include communicating with authentication console 412 to indicate that the user has access to the secured area 104, and can further include actions such as unlocking a door or permitting access through a turnstile.

Figure 6:
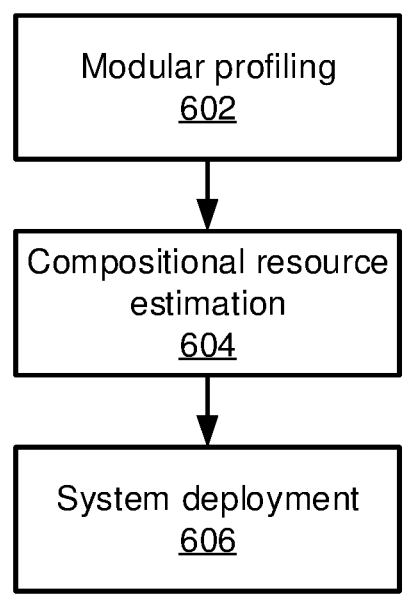
FIG. 6 is a block/flow diagram for a method for deploying an application in an environment, using a modular profiling approach to reduce profiling overhead, in accordance with an embodiment of the present invention.

Referring now to FIG. 6, a high-level block/flow diagram of a method for designing and deploying a video analytics system is shown. Block 602 performs modular profiling, following a directed acyclic graph of a monitoring system and its applications. Modular profiling 602 is generally performed once a module is fully developed, so that the module's profile can be stored in a database for later reference.

Block 604 performs compositional resource estimation, where profiles of modules in each application can be composed to predict resource usage without the need to run anything. Module profiles are called up from the database and are composed in block 604, depending on the applications in the deployment. Based on these profiling and resource estimation steps, block 606 designs and deploys a video analytics system, with the deployed resources being suitable to meet the needs of a given environment. These steps will be shown in greater detail below.

Figure 7:
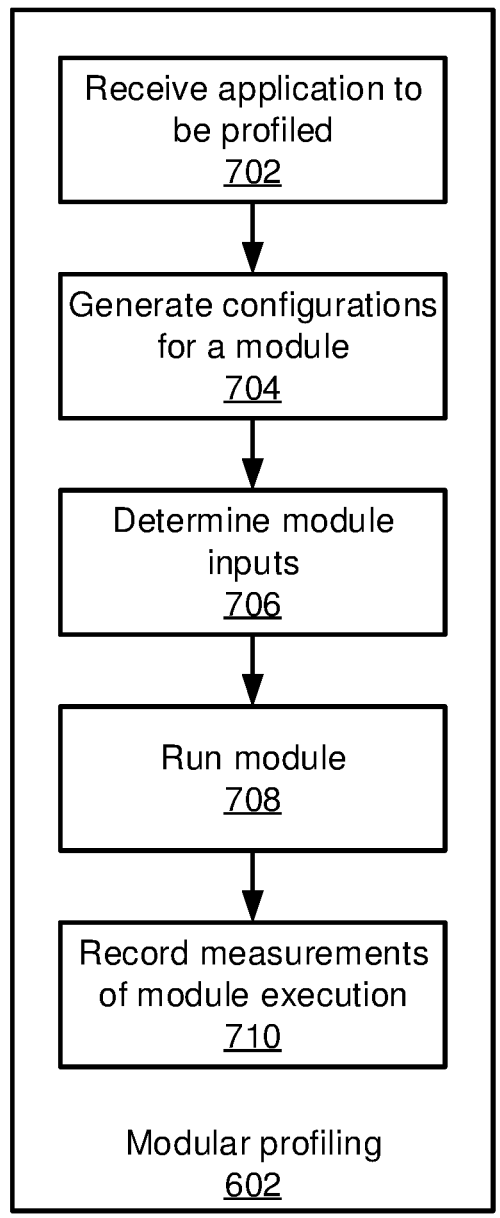
FIG. 7 is a block/flow diagram of a method for profiling modules in an application in accordance with an embodiment of the present invention.

Referring now to FIG. 7, a block/flow diagram with additional detail on module profiling 602 is shown. Each module performs a specific job. The resource usage (or "profile") of the module depends on the configuration of the module, the hardware it is using, and the input data it receives. The performance of the module does not depend on where that input data comes from. The present embodiments therefore test the module with different configurations, on different hardware, and with different inputs. Information about the module's performance in the different test scenarios is recorded in a database. This process is repeated for every module in an application. In the event that a module is repeated within an application, previously generated profiles for the module that match the new instance (e.g., having similar inputs) can be reused instead of repeating module profiling for all configurations and inputs.

Block 702 receives an application to be profiled. Block 702 selects one module at a time for profiling, in topological order. The module is selected from a directed acyclic graph that represents the entire application. The application's directed acyclic graph can be specified by the application developer, where each function in the application is represented as a node of the graph. Thus, for example, a video-sensor module can connect to a face-detection module, which can connect to a face matching module. Since a development can include many applications (e.g., authentication, crowd detection, maintaining a watchlist), the different applications in the deployment can be merged into a single directed acyclic graph by merging instances of the same module across different applications. For example, if two different applications use the same face detection functions, then this module can be profiled once and can be reused for each of the applications.

Block 704 generates a set of configurations for the received module. The module can include boundary conditions that limit the number of possible configurations. Block 704 generates the set of configurations within the boundary conditions. For example, one configuration parameter could be a maximum number of faces that a module can detect, with the parameter including a range of values. Block 704 will then generate a set of configurations that spans the range of values.

Block 706 determines the inputs to use when testing the module. When profiling an application in an end-to-end manner, determining the input is relatively simple. In such a case, the input could be video from a camera or stored file, or a stream of user clicks. However, when profiling at the module level, selecting an input for the modules can be more challenging, as not every module will accept primary input, and may instead receive the outputs of other modules. To profile downstream modules, outputs from the upstream modules are used. Block 706 thus selects appropriate inputs for the module from a database of inputs, which have been saved from the execution of upstream modules in the application. Since the earlier modules have already been profiled with various configurations, multiple different outputs can be saved for use as inputs in later modules. All of the unique outputs of the earlier modules can be used as inputs.

Block 708 runs the module, using the determined configurations and inputs. This step will be described in greater detail below, but it should be understood that the module is executed on a variety of different combinations of configurations, inputs, and hardware, and outputs and performance metrics for each execution are recorded to generate a profile for the module. Block 710 stores the measurements of the module execution, including the performance metrics and the outputs of the module, in a database for later retrieval. Block 708 repeats the execution of the module for every configuration and every input.

Figure 8:
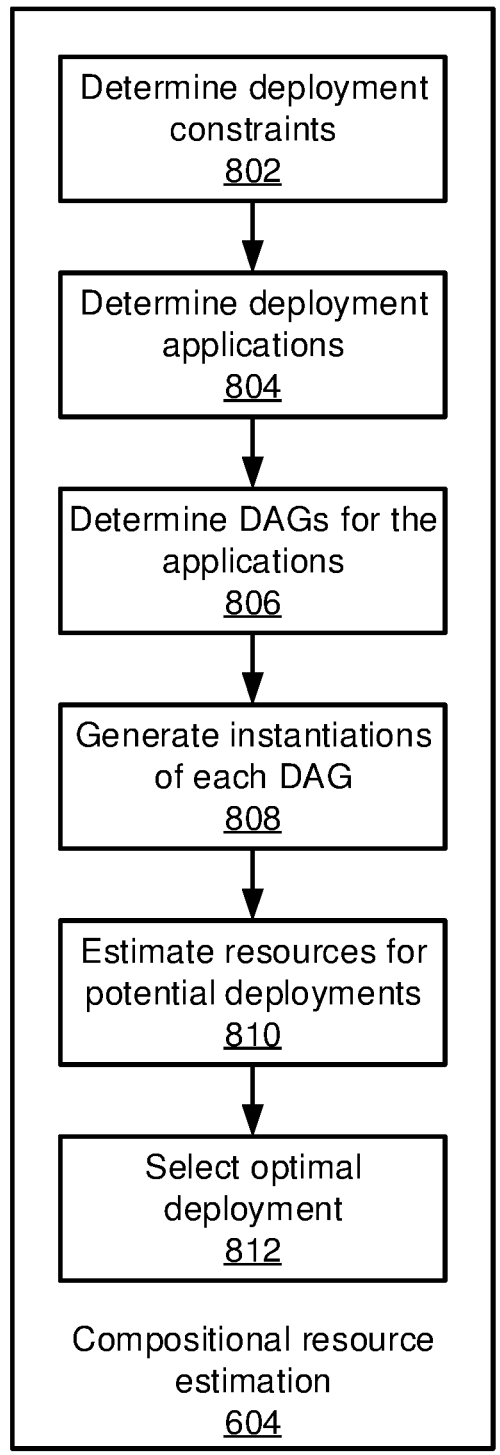
FIG. 8 is a block/flow diagram of a method for compositional resource estimation in an application in accordance with an embodiment of the present invention.

Referring now to FIG. 8, a block/flow diagram with additional detail on compositional resource estimation 604 is shown. Resource estimation 604 determines the resources, for example including hardware resources, that are needed for a deployment. Resource estimation 604 uses the module profiles 602 to identify the resources needed on the module level, and then determines an optimal deployment of resources needed to meet the needs of a given application.

Block 802 determines the constraints for a deployment. The constraints can include, for example, a set of applications to be deployed, the type of primary input that is expected (e.g., frames from a video stream), statistical descriptors of the primary input, performance metrics needed for the applications, a maximum number of hardware resources, etc. These constraints can be encoded as partial configurations of modules in the applications or, in some embodiments, as bounds on the performance of modules.

A deployment generally has multiple applications that are part of it. These applications may have modules in common, for example in authentication functions, image processing, or security functions. Before estimating resources, block 804 determines what applications will be run and performs a reduction, checking for common modules across the applications and merging them, to remove redundancy. For example, if a deployment needs two applications, which have modules in common, then only one instance of each of the common modules need actually be made part of the deployment. The output of the last common module is forwarded to the applications' unique modules. In this manner, the entire deployment of one or more applications can be reduced to a single directed acyclic graph of modules in block 806.

This deployment directed acyclic graph is only a logical representation of the deployment. For an actual instantiation of a directed acyclic graph, each module has a specific, complete configuration. Block 808 generates instantiations of the directed acyclic graph by assigning configurations to the modules in the graph. This can be accomplished by a depth-first traversal of the graph, starting at the first module with primary inputs, the hardware, the constraints and partial configurations. Additional detail regarding the operation of block 808 will be described below. Block 808 produces all possible configurations for a deployment that adhere to the partial configurations and the constraints, where a partial configuration is the subset of possible configurations that is dictated by the parameters set by, e.g., upstream modules.

Block 810 estimates the resource usage for every deployment instantiation that is generated by block 808. For each deployment, block 810 traverses the deployment directed acyclic graph and uses a tuple defined as, e.g., <input, hardware, configuration> to characterize each module and to call up associated resources for the module from the database. Block 810 aggregates the resources for the modules in an instantiation for the deployment of the application. For example, if a given application has four modules, and they use 1.2 cores, 2 cores, 0.5 cores, and 3 cores, respectively, then the overall CPU usage for the deployment would be 6.7 cores. Similarly, bandwidth usage between modules can also be estimated, along with overall memory usage, power requirements, and other resource characteristics.

Block 812 then selects an optimal deployment, according to a selection criterion. For example, if the CPU resources need to be minimized, then the deployment with the lowest number of estimated CPU cores is used. Once a deployment is selected, the resource estimates for that deployment are used to determine the quantity and quality of the hardware that is needed to run the deployment.

Figure 9:
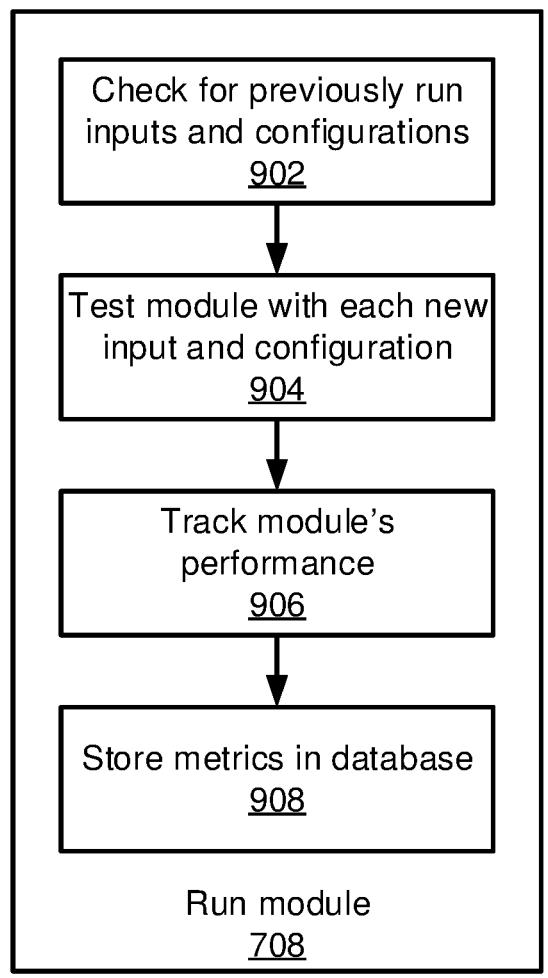
FIG. 9 is a block/flow diagram of a method for testing modules using particular inputs and configurations for profiling, in accordance with an embodiment of the present invention.

Referring now to FIG. 9, additional detail is shown on how a module is run in block 708. Block 902 checks whether any of the called-for combinations of inputs and configurations for a module have already been run. Such combinations are removed from the list of combinations to run, as the performance of the module in these situations has already been measured. Block 904 then runs the module for each remaining combination, providing a selected input and capturing the output. The module is run just as it would be in a full application.

During execution of the modules, block 906 uses instrumentation in the modules to track performance and resource usage metrics, for example including a number of input messages, a number of output messages, a size of messages, a rate of messages, CPU consumption, memory consumption, bandwidth consumption, etc. These metrics are exported and indexed by the module's configuration and selected input. Block 908 stores the captured output in a database, for example indexed by the tuple <input, hardware, configuration>. This process can be repeated for every possible combination of input and configuration.

Figure 10:
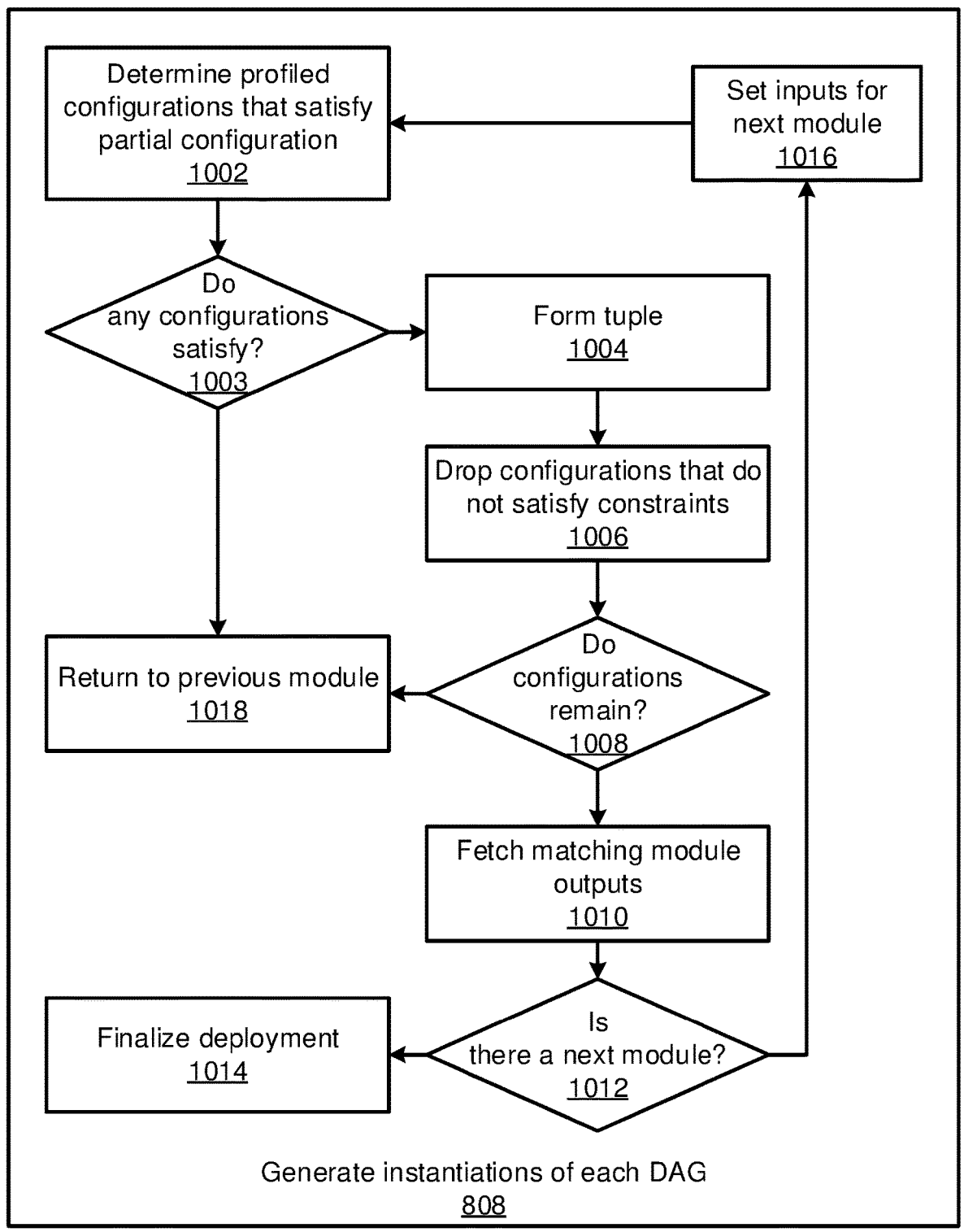
FIG. 10 is a block/flow diagram of a method for generating instantiations of a graph representation of an application, using profiled module performance and outputs, in accordance with an embodiment of the present invention.

Referring now to FIG. 10, additional detail is shown on the generation of instantiations in block 808. Block 1002 checks all of the stored, profiled configurations to determines which ones are compatible with a partial configuration for the module being run. Block 1004 determines whether any configurations satisfy the partial configuration. If none do, block 1018 stops the traversal of the module and returns to the previous module in the search.

If at least one configuration satisfies the partial configuration, block 1004 forms an <input, hardware, configuration> tuple to characterize the module. Block 1006 determines whether any of the configurations fail to satisfy a performance constraint, based on stored performance information for the module for any stored configurations. If any configuration fails to satisfy the performance constraint, then block 1006 drops those configurations from consideration. For example, if a constraint sets a maximum rate of detected faces from a face detection module at 5 faces per second, then any configuration that generates a higher rate would be dropped.

Block 1008 determines whether any configurations remain at this point. If not, block 1018 stops the traversal of the module and returns to the previous module in the search. If at least one configuration remains, block 1010 fetches matching module outputs from the database.

Block 1012 determines whether there is a subsequent module in the directed acyclic graph. If not, for example if the module being run is a leaf node in the graph, then the deployment of the module can be finalized in block 1014. If there are additional child nodes in the graph, then block 1016 sets inputs for a next module, based on the outputs of the current module.

Processing continues in the manner across the entire directed acyclic graph, until feasible configurations have been determined for all of the modules. There may be multiple configurations that are feasible for one or more modules in the graph—the optimal configurations are selected at a later stage (block 812 of FIG. 8). If there are any modules with no feasible configurations, then an error message can be generated. In some embodiments, the constraints can be automatically adjusted to permit a greater range of possible configurations. These new configurations can be presented to a user before committing a deployment, to give them the option to approve changes to the constraints. In other embodiments, the deployment can be committed in block 606 without manual review.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 11:
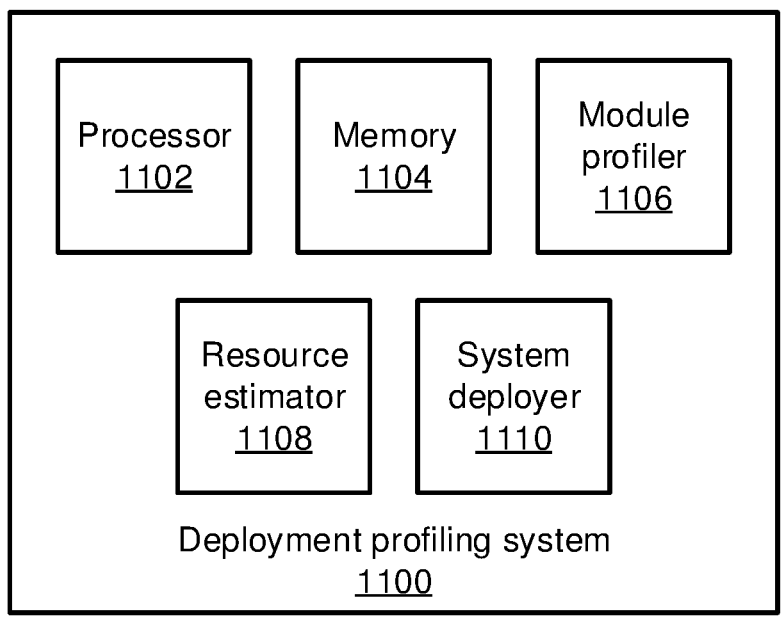
FIG. 11 is a block diagram of a system for deploying an application in an environment, using a modular profiling approach to reduce profiling overhead, in accordance with an embodiment of the present invention.

Referring now to FIG. 11, a deployment profiling system 1100 is shown. The system 1100 includes a hardware processor and a memory 1104. A module profiler 1106 performs profiling for each of the modules in one or more applications. A resource estimator 1108 identifies resources that will be needed for a particular deployment of the one or more applications, based on the profiles of the modules and a set of constraints. System deployment 1110 then deploys the applications for a particular installation. As noted above, the deployment can be committed with or without manual review. For example, if it is determined that a certain number of processing resources are needed, block 1110 can automatically instantiate appropriate processes in, for example, a local or cloud-based processing center.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for deploying a video analytics system, comprising:
    determining one or more applications for a security system in an environment, including one or more constraints;
    profiling each functional module in a directed graph representation of one or more applications to generate one or more configurations for each functional module using a hardware processor, where the nodes of each graph representation represent functional modules of the respective application, with repeated module configurations being skipped;
    estimating resource usage for each of the one or more applications using the one or more configurations of each functional module and the one or more constraints;
    deploying the one or more applications in the environment; and
    performing a security action in the environment using the one or more applications.

2. The method of claim 1, wherein profiling each functional module comprises running each module under a plurality of different configurations and inputs.

3. The method of claim 2, wherein profiling each functional module further comprises storing a respective output for each combination of a configuration and an input for the module.

4. The method of claim 3, wherein estimating resource usage for each of the one or more applications comprises identifying outputs for each module, based at least one feasible configuration of the module, in accordance with stored outputs that correspond to the at least one feasible configuration.

5. The method of claim 4, wherein estimating resource usage for each of the one or more applications further comprises performing a depth-first traversal of each respective graph representation.

6. The method of claim 5, wherein estimating resource usage for each of the one or more applications further comprises applying an output, associated with each respective module, as an input to child modules associated with the respective module in the graph representation.

7. The method of claim 2, wherein profiling each functional module further comprises storing performance metrics for each combination of a configuration and an input for the module.

8. The method of claim 7, wherein estimating resource usage for each of the one or more applications comprises comparing the stored performance metrics for each combination of a configuration and an input for each module to the one or more constraints and excluding combinations that cannot satisfy the one or more constraints.

9. The method of claim 1, wherein estimating resource usage for each of the one or more applications comprises selecting an optimal configuration for each module according to one or more optimization criteria.

10. The method of claim 1, wherein the graph representation of each of the one or more application is a single, condensed graph representation with redundant modules removed.

11. A system for deploying a video analytics system, comprising:
    a hardware processor; and
    a memory that stores a computer program, which, when executed by the hardware processor, causes the hardware processor to:
        determine one or more applications for a security system in an environment, including one or more constraints, and to profile each functional module in a directed graph representation of the one or more applications to generate one or more configurations for each functional module, where the nodes of each graph representation represent functional modules of the respective application, with repeated module configurations being skipped;
        estimate resource usage for each of the one or more applications using the one or more configurations of each functional module and the one or more constraints;
        deploy the one or more applications in the environment; and
        perform a security action in the environment using the one or more applications.

12. The system of claim 11, wherein the module profiler is further configured to run each module under a plurality of different configurations and inputs.

13. The system of claim 12, wherein the module profiler is further configured to store a respective output for each combination of a configuration and an input for the module.

14. The system of claim 13, wherein the resource estimator is further configured to identify outputs for each module, based at least one feasible configuration of the module, in accordance with stored outputs that correspond to the at least one feasible configuration.

15. The system of claim 14, wherein the resource estimator is further configured to perform a depth-first traversal of each respective graph representation.

16. The system of claim 15, wherein the resource estimator is further configured to apply an output, associated with each respective module, as an input to child modules associated with the respective module in the graph representation.

17. The system of claim 12, wherein the module profiler is further configured to store metrics for each combination of a configuration and an input for the module.

18. The system of claim 17, wherein the resource estimator is further configured to compare the stored performance metrics for each combination of a configuration and an input for each module to the one or more constraints and to exclude combinations that cannot satisfy the one or more constraints.

19. The system of claim 11, wherein the resource estimator is further configured to select an optimal configuration for each module according to one or more optimization criteria.

20. The system of claim 11, wherein the graph representation of each of the one or more application is a single, condensed graph representation with redundant modules removed.

* * * * *